United States Patent [19]

Woodward et al.

[11] 4,126,927
[45] Nov. 28, 1978

[54] APPARATUS AND METHOD FOR INSERTING RIGID CORES INTO FLEXIBLE TUBING

[76] Inventors: Ellis C. Woodward, Rte. 1, Box 145, Tunas, Mo. 65764; James D. Woodward, 212 South St., Box 40; John Woodward, Jr., Rte. 1, both of Crane, Mo. 65633

[21] Appl. No.: 799,251

[22] Filed: May 23, 1977

[51] Int. Cl.² .............................................. B23P 11/02
[52] U.S. Cl. ....................................... 29/450; 29/234; 29/235
[58] Field of Search ................. 29/234, 235, 450, 451, 29/148.4 D

[56] References Cited

U.S. PATENT DOCUMENTS

| | | | |
|---|---|---|---|
| 2,293,426 | 8/1942 | Coberly | 29/451 |
| 2,347,003 | 4/1944 | Searle | 29/234 |
| 2,645,004 | 7/1953 | Dorner | 29/234 X |
| 2,691,402 | 10/1954 | Swanson et al. | 29/235 X |
| 3,138,859 | 6/1964 | Edwards | 29/234 X |

Primary Examiner—Charlie T. Moon
Attorney, Agent, or Firm—Fishburn, Gold & Litman

[57] ABSTRACT

An apparatus and method for inserting rigid cores into flexible tubing comprises a frame having a tubing retainer and a motor device, having a chuck and being mounted on the frame in spaced relation to said retainer for engaging and translating the core longitudinally and coaxially with respect to the tubing. A tapered tip is connected with the free end of the core, and a source of pressurized air is attached to the tubing in communication with the central, axial aperture thereof. An inclined leading edge of the tip is shaped to mate with the tubing aperture, and is translated into sealing abutment with the terminal edge of the tubing free end. Pressurized air is introduced into the tubing and radially expands the unconstricted side wall thereof to an enlarged diameter for inserting the core therein. Adjustable stabilizer members are mounted on the frame along a medial portion of the tubing, and are positioned adjacent to opposing sides of the tubing to prevent bending and buckling of the tubing during the insertion of the core.

12 Claims, 9 Drawing Figures

APPARATUS AND METHOD FOR INSERTING RIGID CORES INTO FLEXIBLE TUBING

This invention relates to an apparatus and method for inserting rigid cores into flexible tubing, and in particular to an apparatus having adjustable stabilizers to prevent bending and buckling of the tubing during core insertion.

Flexible tubing having a relatively thin side wall, and constructed of elastic and resilient material such as rubber, synthetic resins and the like, is assembled onto substantially rigid mandrels or cores in the manufacture and/or repair of all types of rollers including printing press rollers, furniture casters, conveyor rollers, and the like. The tubing is selected having an inside diameter slightly smaller than the outside diameter of the core, such that when assembled, the two members are securely and frictionally interconnected. During the insertion of the core into the tubing, substantial frictional forces are developed between the core and tubing and tend to flex and buckle the tubing, thereby hindering efficient assembly, and often irreparably damaging the tubing, which results in substantial waste.

The principal objects of the present invention are: to provide an apparatus and method for inserting rigid cores into flexible tubing having adjustable stabilizers to prevent bending and buckling of a tubing first portion wherein the core is received, for efficient, high speed production; to provide such an apparatus wherein the stabilizer is positioned adjacent to an exterior portion of the tubing side wall for unhindered core insertion; to provide such an apparatus which is particularly versatile for the production of rollers having varied diameters and lengths; to provide such an apparatus wherein the supporting structure is disposed in a vertical orientation for nonbinding, vertical insertion of the cores into the tubing and efficient alignment of the same; to provide such an apparatus having a pivotally mounted ram and mating latch for easy and efficient connection of the cores therewith; to provide such an apparatus wherein the stabilizers are pivotally mounted on arms having over-center locking means for quick and easy adjustment to accomodate variously sized cores; to provide such an apparatus for use with a continuous, elongated segment of flexible tubing for continuous, efficient, and speedy assembly operation; and to provide such an apparatus which is economical to manufacture, efficient in use, capable of a long operating life, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an apparatus embodying the present invention for inserting rigid cores 2 into flexible tubing 3. The apparatus 1 comprises a supporting structure, such as a frame 4 having a retainer or clamp 5 connected therewith for retaining the tubing 3, and a motor device 6 having a chuck 7 and being connected with the frame in spaced relation with the clamp, for engaging and translating the core 2 longitudinally and coaxially with respect to the tubing 3. A pressurized air source 8 is communicated with one portion of the tubing and radially expands the unconstricted side wall of the free portion thereof to an enlarged diameter to facilitate core insertion. Adjustable stabilizer members 9 are connected with the frame 4 along the free end portion of the tubing 3, and are positioned nonclampingly adjacent to opposing sides of the same to prevent bending and buckling of the same during the insertion of the core therein.

The core 2 comprises a body portion 15 (FIG. 2) having an outer surface 16 thereof on which a segment 17 of flexible tubing is assembled, and is generally in the nature of a roller. The tubing 17 is selected having an inside diameter slightly less than the outside diameter of the body 15 such that when assembled, the resilient, frictional forces developed therebetween securely engage and retain the two members together. The core 2 is constructed of a substantially rigid material such as steel, iron, or the like, and in this example, has a cylindrical shape and includes a pair of pinions 18 coaxially extending from each core body end 19, and having a reduced diameter. The pinions 18 serve as bearing surfaces when the roller is connected with the parent machine such as a printing press, conveyor, or the like.

Figure 1:
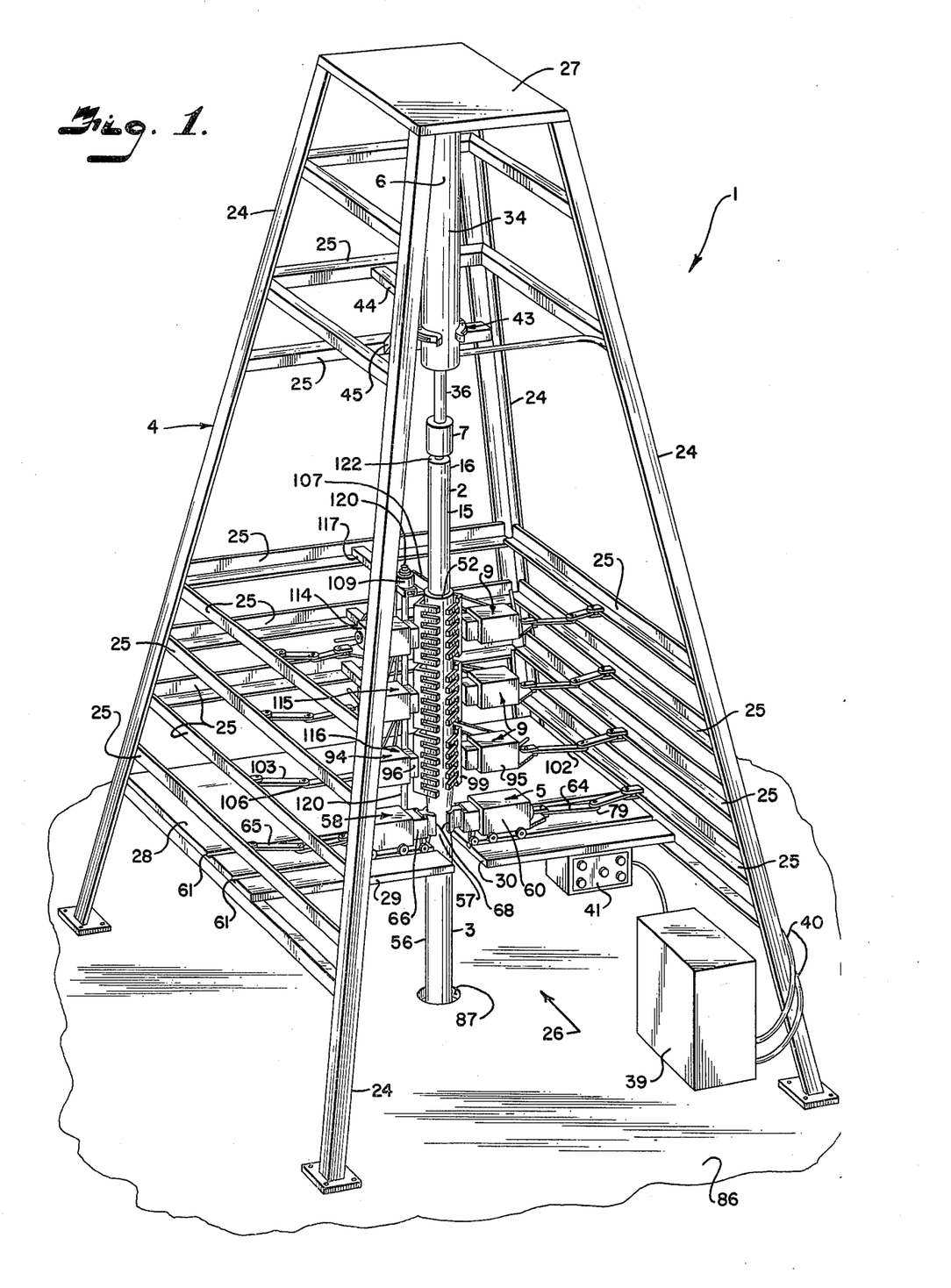
FIG. 1 is a perspective view of an apparatus embodying the present invention.

The supporting structure provides means for mounting the motor device 6 and tubing clamp 5 in a spaced apart relation thereon (FIG. 1), and the stabilizer 9 is connected therewith interjacent the motor and clamp 5. The illustrated frame 4 is vertically oriented for accurate tubing-core alignment with coaxial weight concentration, and is in the shape of a derrick having four upstanding legs 24 with horizontal braces 25 extending between three of the four legs. The frame has a foursided, frustropyramidal exterior shape with one side 26 thereof being open and free from braces to provide access to the clamp 5, stabilizers 9, and flexible tubing 3. A top support plate 27 is attached to the uppermost end of each leg 24, and a lower plate 28 is attached to the frame and frame braces 25 at a convenient, working height from the floor surface. The forward edge 29 of the lower plate 28 is spaced inwardly from the front of the frame, and includes a U-shaped aperture 30 therethrough, shaped to receive flexible tubing of various sizes therein.

Figures 2, 3:
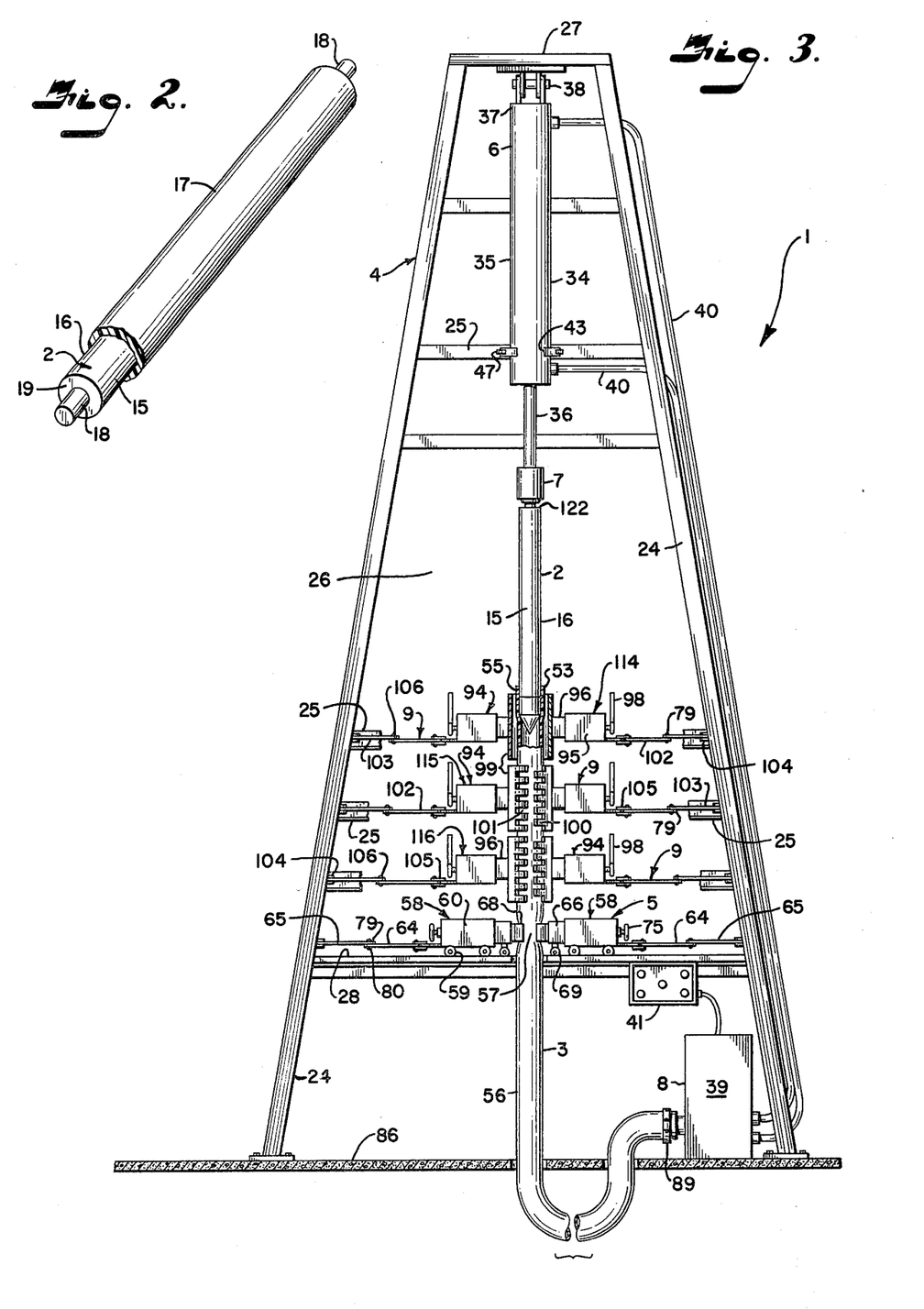
FIG. 2 is an enlarged perspective view of an article manufactured by said apparatus in the form of a roller having a portion of the outer covering thereof broken away.
FIG. 3 is a front elevational view of the apparatus in a core inserting position.

The motor 6 is attached to and supported by the upper frame plate 27, and comprises means such as a screw motor, a pneumatic ram, or the illustrated hydraulic ram comprising double acting cylinder 34 (FIG. 3). The cylinder 34 comprises a housing 35 and a piston rod 36, and in this example, the upper end of the cylinder housing 37 is pivotally connected to the frame upper plate 27 by a pivot joint 38, and allows the cylinder to rotate toward and away from the frame open side 26. The lower end of the piston rod 36 includes means for clamping the core end portions therein, such as threads, or the illustrated chuck 7. The chuck 7 is adjustable to accomodate various sized cores, and in this example engages the upper pinion portion 18 of the core 2. The hydraulic cylinder 34 is operably connected with a source of pressurized fluid 39 through lines 40, and is activated and controlled by a switching device 41 mounted on the lower surface of the bottom frame plate 28.

Figure 4:
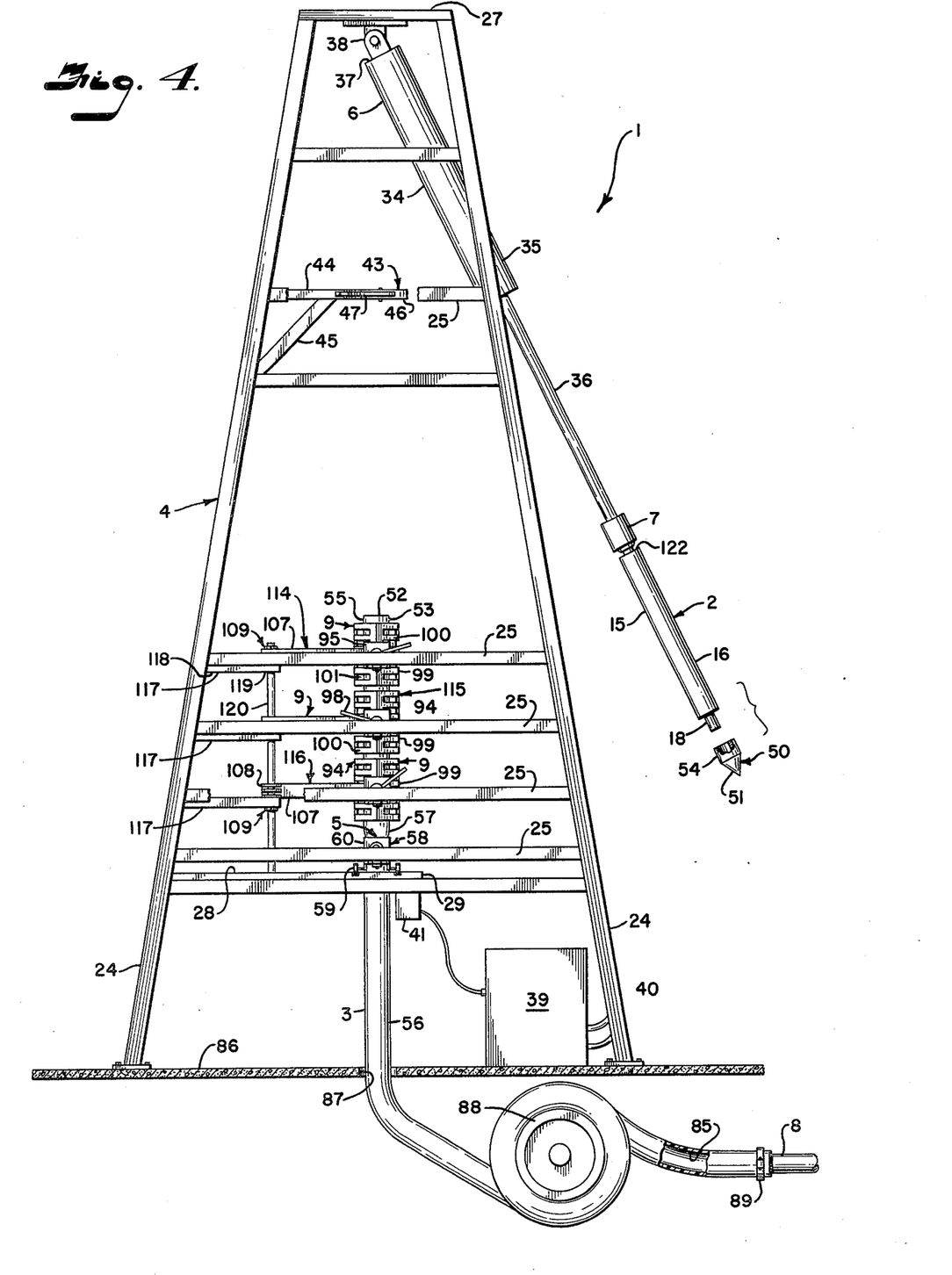
FIG. 4 is a side elevational view of the apparatus in a core loading position.
Figure 9:
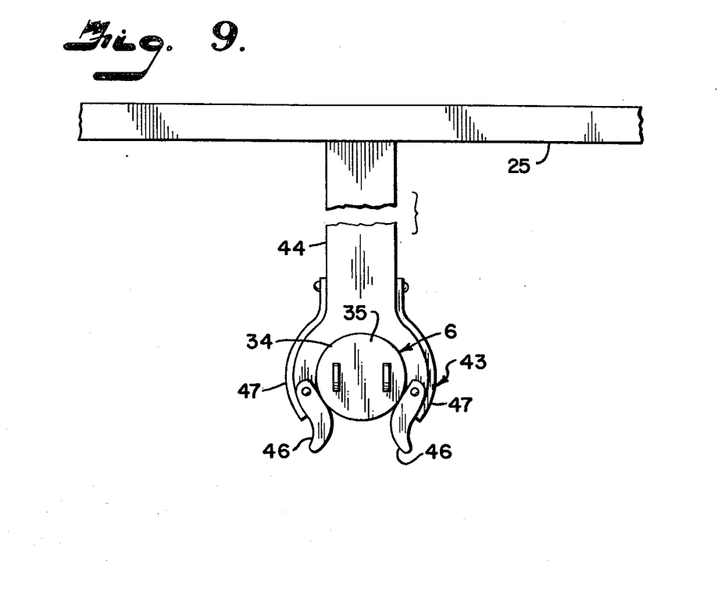
FIG. 9 is a top elevational view of a latch releasably retaining a core engaging cylinder therein, for placing the same in coaxial orientation with the tubing during insertion.

A latch 43 is connected with the frame 4 and selectively engages the cylinder 34 and positions the cylinder and core in a coaxial orientation with the tubing 3 during core insertion. The illustrated latch 43 (FIG. 9) comprises a Y-shaped bracket 44 having the outer end thereof attached to frame cross brace 25, and includes an angle brace 45 (FIG. 4). The free end of the bracket 44 extends centrally of the derrick frame 4, and includes a pair of hinged fingers 46 and leaf springs 47. A circular aperture is formed between the bracket 44 and fingers 46, which receives and selectively retains a lower portion of the cylinder 34 therein. During insertion, the cylinder 34 is retained in a coaxial relationship with the tubing by the latch 43. After an assembled core is removed from the chuck 7, the piston rod 36 is extended downwardly (FIG. 4), and the piston housing 35 is pulled out from engagement with the latch 43 and pivoted toward the open side 26 of the frame. The operator then clamps another core in the chuck 7, and translates the same upwardly with the cylinder, thereby operating in the nature of a crane. The cylinder is swung inwardly, away from the frame open side into the latch 43, and is retained therein by the spring loaded fingers 46 for subsequent core insertion.

A tapered tip 50 is connected with the lower end of the core 2, and includes an inclined leading edge 51 (FIG. 4) which is shaped for mating, sealing abutment against the terminal edge 52 of the tubing free end 53. The illustrated tip 50 has a conically shaped point 51 and a centrally apertured sleeve 54 connected therewith. The tip 50 frictionally engages the lower pinion 18 of the core by means such as a press fit, spring loaded pads, or the like. The diameter of the largest circular section of both the tip 50 and the outer surface of the sleeve 54, is substantially identical with the outside diameter of the core body 15, to provide a smooth, even, exterior surface to facilitate insertion.

Figure 5:
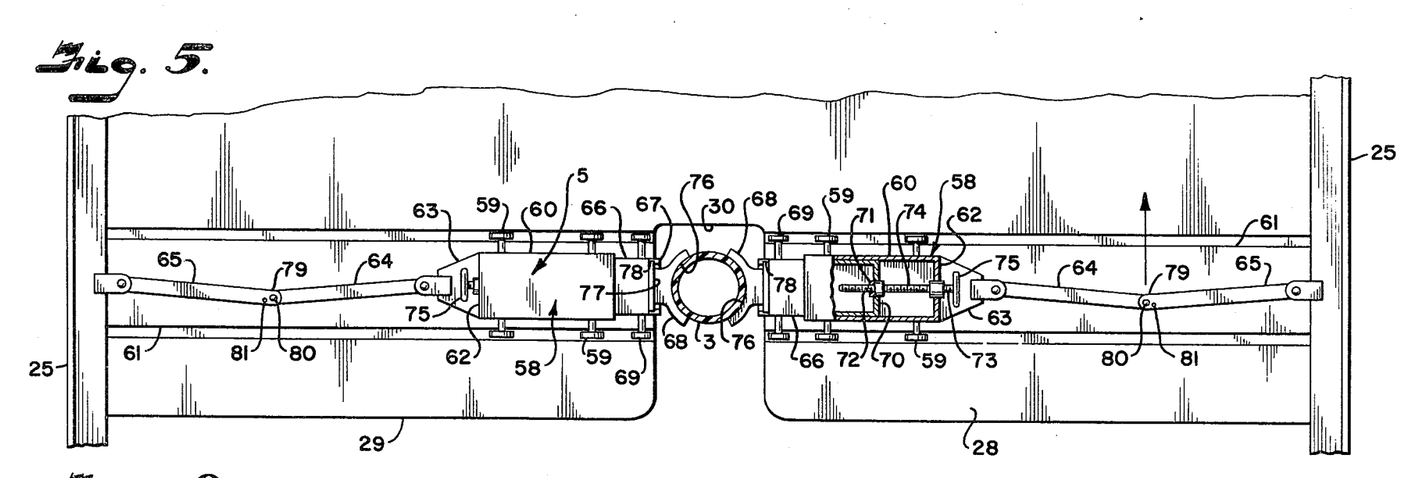
FIG. 5 is a fragmentary, top plan view of the apparatus, particularly showing adjustable tubing clamps.

The tubing clamp 5 is connected with the frame 4 and is adapted for receiving and retaining therein a segment of flexible tubing. The tubing has first and second portions 55 and 56 respectively extending opposingly from the ends of the clamp 5, and includes a third portion 57 engaged by the clamp. The clamp 5, as illustrated in FIGS. 3 and 5, comprises a pair of telescopically adjustable jaws 58 supported on the upper surface of the lower frame plate 28 by track engaging wheels 59. The wheels 59 are pivotally attached to a tubular housing 60, and translate in a pair of slots or tracks 61 positioned in the upper surface of the frame plate 28 to limit the motion of the jaws to rectilinear translation for secure clamping action. The outer end 62 of each housing 60 includes a bracket 63 having a pair of pivot arms 64 and 65 connected therewith. The outer pivot arm 65 is, in turn, attached to a frame cross brace 25. An extension member 66 is telescopically mounted in each of the housings 60, and includes a slotted forward end 67 which receives and supports an adjustable jaw member 68 therein. A pair of rollers or wheels 69 are rotatably attached on opposing lateral sides of each extension member 66, and support and guide the same in the tracks 61. The outer end 70 of each extension member 66 includes a threaded portion, such as sleeve 71 having a threaded interior aperture 72. The outer end of the housing 60 has the terminal end or head 73 of a threaded rod 74 rotatably mounted therein. The inner end of the rod 74 is threadedly connected with the sleeve 71, whereby rotation of the rod translates the extension member 66 inwardly and outwardly with respect to the housing 60 to accomplish clamping adjustment. A hand wheel 75 having an outer marginal surface thereof particularly adapted for grasping is connected with the rod end 73 to facilitate rotation thereof. Each of the jaw members 68 includes a contoured surface 76 which mates with the outer surface of the tubing. The illustrated jaw member surface 76 has an arcuate shape and mates with the cylindrically shaped tubing third portion 57 clamped therein. A plate member 77 is attached to the rear portion of the jaw member 68 and removably connects the same with the extension member 66 by vertical placement in mating slot 78. A plurality of variously sized jaw members 68 are provided, a pair of which are selected by the operator in accordance with the size and shape of the tubing used. The entire jaw assembly 58 is bodily retracted from the central portion of the lower plate 28 by manipulating pivot arms 64 and 65. An over-center lock mechanism 79 retains the jaw assemblies in an extended, clamped position. Inward rotation of the center pivot 80, as shown by the illustrated arrow (FIG. 5), bodily translates the jaw assemblies outwardly and apart, and provides a quick and easy means for replacing or changing the tubing. The over-center lock 79 is of a conventional design, and comprises means such as a pin 81 attached to and depending from arm 65 adjacent center pivot 80, and engaging the end of arm 64. The lock 79 prevents outward rotation of the arms beyond an over-center position, wherein the arms are slightly forwardly of an aligned condition, and are disposed at a slight angle to each other.

A source of pressurized air 8 (FIG. 4) is connected with the tubing second portion 56 disposed on an opposite side of the clamp 5 from free end 53, and communicates with the axial aperture 85 of each of the tubing portions 55, 56 and 57. The pressure supplied by the air supply is dependent upon the type and dimensions of the tubing in which the core is inserted, and in this example is in the nature of 60 pounds per square inch in use with synthetic rubber tubing having a 1 inch inside diameter and a ⅛ inch side wall thickness. As best illustrated in FIGS. 3 and 4, additional tubing may be stored and retained beneath the apparatus frame 4, and payed therefrom through the clamp 5 for assembly ease. Additional tubing may also be stored on the upper surface of the floor 86 supporting the apparatus, or may be threaded through an aperture 87 in the supporting floor 86 (FIGS. 3 and 4), and/or retained by means such as a reel 88 (FIG. 4) in a lower, adjacent area. The air supply 8 is separably connected with the tubing by means such as a hose clamp 89.

Figure 6:
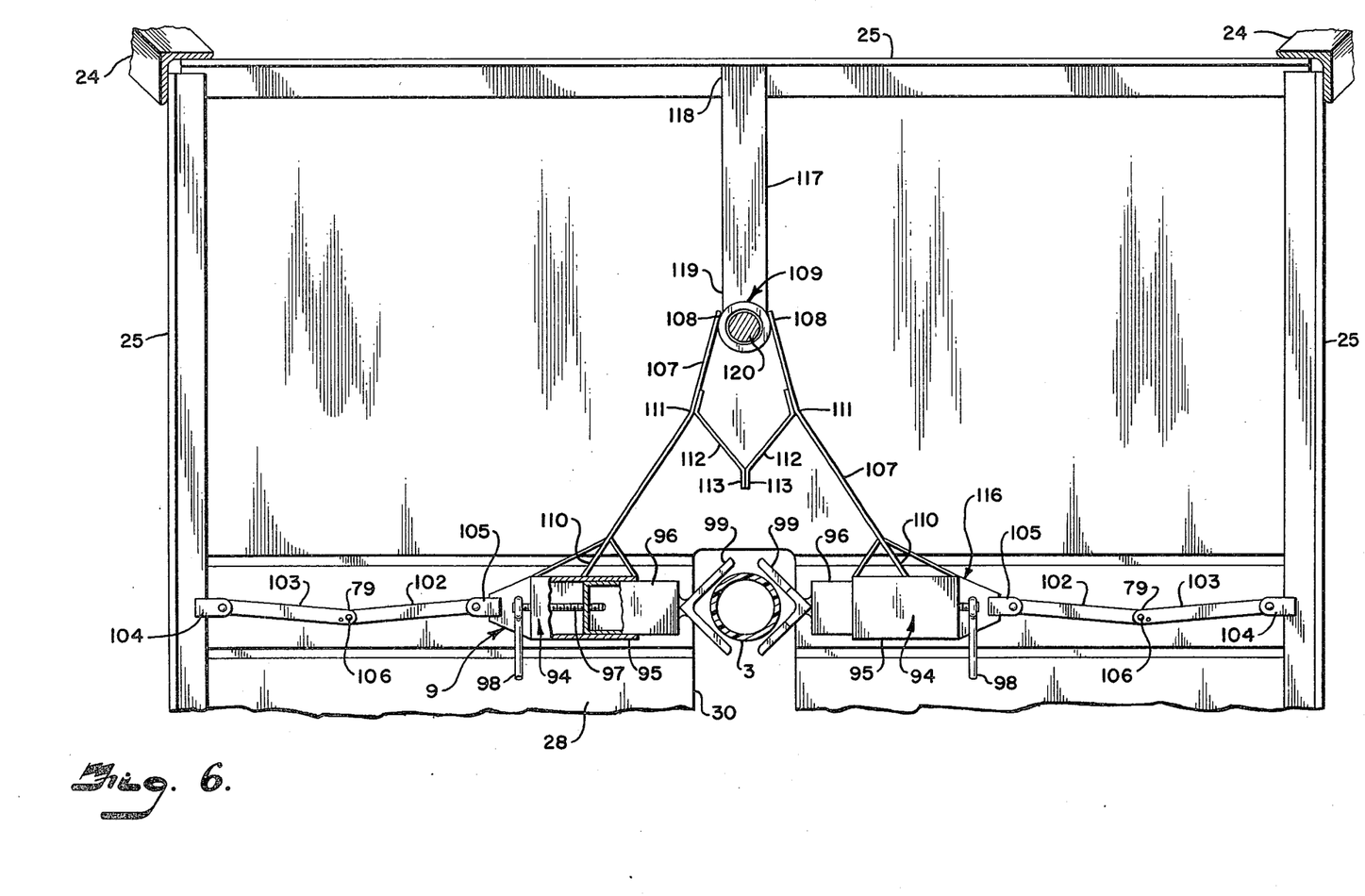
FIG. 6 is a fragmentary, top plan view of the apparatus, particularly showing the stabilizers in a locked, operational position.
Figure 8:
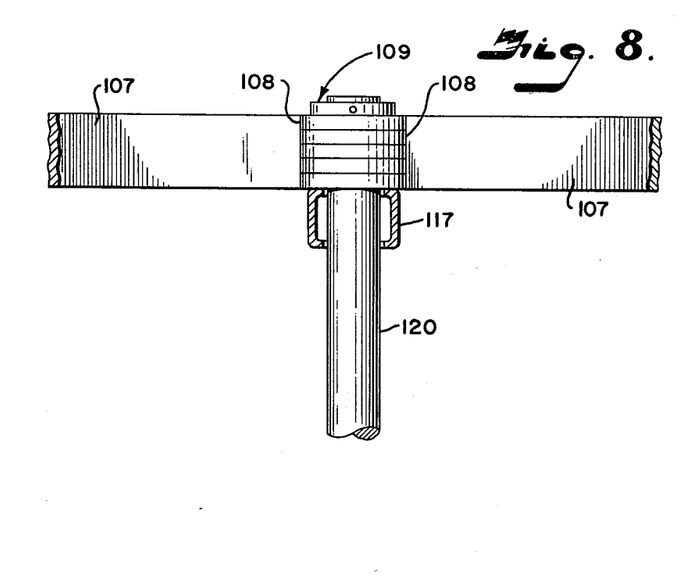
FIG. 8 is a fragmentary vertical cross-sectional view of a hinge assembly connecting the stabilizers with the frame.

A stabilizer 9 is connected with a medial portion of the frame 4 and includes laterally adjustable members 94 (FIG. 6) disposed at opposing sides of the tubing first portion 55, positioned nonclampingly adjacent to outer portions thereof for preventing bending and buckling of the tubing during core insertion. Each of the stabilizer members 94 includes a housing 95, a telescopically mating extension member 96, and a threaded rod 97 pivotally mounted in the housing and threadedly engaging the extension member for inward and outward relative translation of the same. A handle member such as a ratchet 98 is connected with the outer portion of rod 97 to facilitate stabilizer adjustment. A V-shaped channel 99 is connected with the inner end of each extension member 96 and is adapted for engaging various sized tubing. The illustrated channels 99 include mating fingers 100 (FIG. 3) and apertures 101 for increased adjustment variation. A pair of arms 102 and 103 support the stabilizer housing 95 and are pivotally connected to the frame and housing at joints 104 and 105 respectively for rotation in a substantially horizontal plane. The arms 102 and 103 are interconnected by an over-center lock mechanism 79 at a center joint 106 to retain the stabilizers in a predetermined position. A pair of second arms 107 are provided, wherein each has the outer end 108 thereof pivotally connected with the frame 4 through a pin and hinge assembly 109. The other ends 110 of the second arms 107 are fixedly attached to the sides of the stabilizer housings 95, and resilient means urge the arms 107 apart to maintain the locked position of support arms 102 and 103. The illustrated arms 107 have supporting angle braces adjacent the ends 110, and include a medial bend 111 and Z-shaped leaf springs 112 having flat outer ends 113 thereof abutting each other. In the illustrated structure, three sets of stabilizers 114, 115 and 116 respectively are coaxially positioned in a vertically spaced apart relationship along the length of the tubing to facilitate the assembly of cores of different lengths. As best shown in FIGS. 4 and 8, the illustrated hinge assembly includes three horizontally positioned arms 117, each having the outer end 118 thereof rigidly attached to a frame cross brace 25. The inner end 119 of each arm 117 includes a vertically disposed aperture wherein a support pin 120 is received. Also, the illustrated outer ends 108 of the second arms 107 are shaped for mutually interlocking, pivotal engagement with the pin 120 (FIG. 8).

Figure 7:
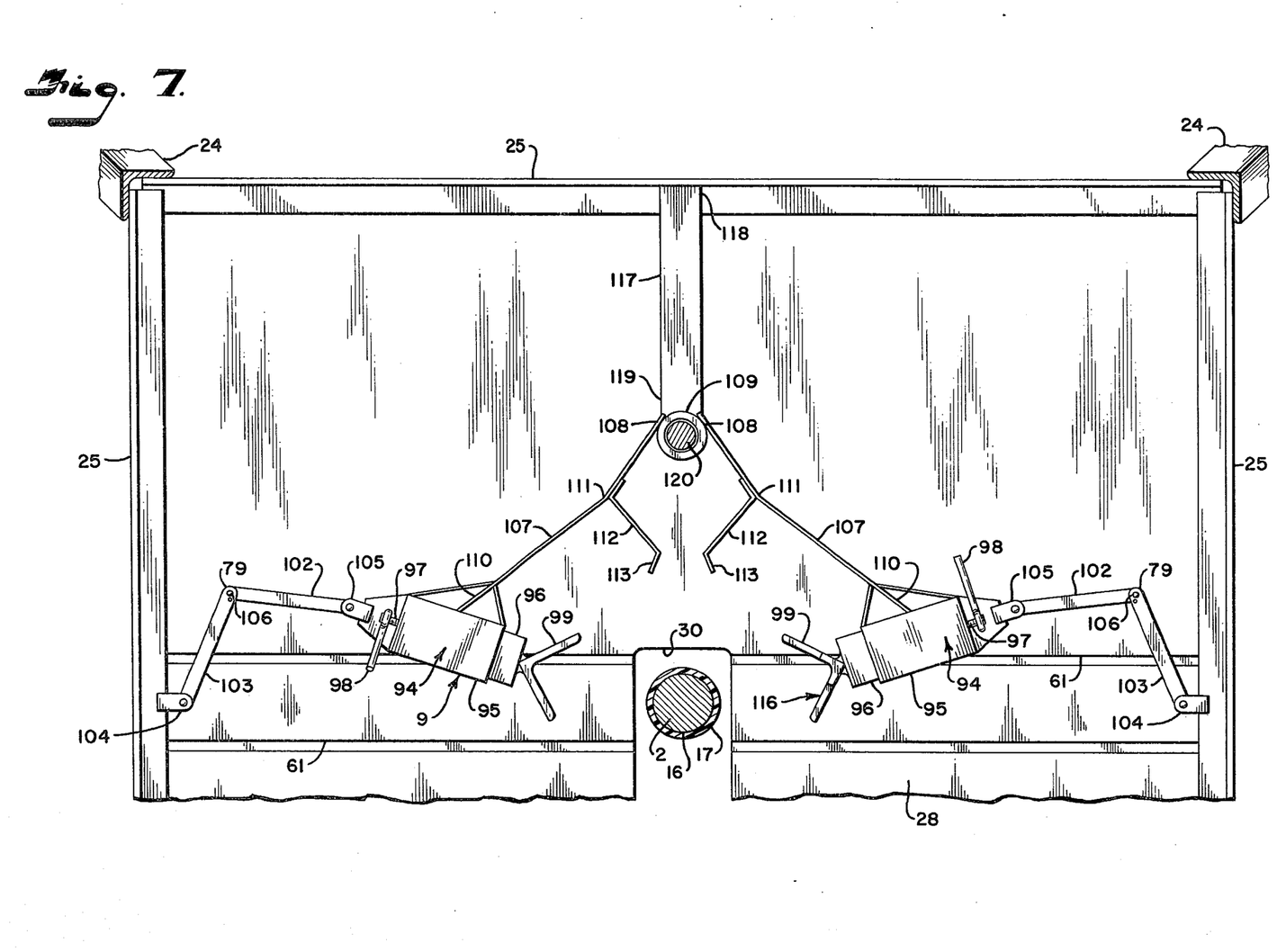
FIG. 7 is a fragmentary, top plan view of the apparatus, particularly showing the stabilizers in a released position.

In operation, the operator is positioned at the open side 26 of the frame, and threads the free end 53 of the flexible tubing through the clamping members 5 upwardly to a position wherein the terminal edge 52 thereof is disposed above and adjacent to the uppermost stabilizer 114. The arms 64 and 65 of each clamp 5 are rotated outwardly toward the operator into a locked position, and the hand wheels 75 are rotated inwardly such that the jaw members 68 abut and frictionally engage the flexible tubing at a portion 57 thereof, preventing vertical translation of the tubing. The jaw members 68 do not appreciably reduce the inside diameter of tubing portion 57, thereby allowing pressurized air to flow freely therethrough. The tubing second portion 56 is connected with the air supply 8 by a clamp 89. The cylinder 34 is then disengaged from the latch 43, swung outwardly toward the open side of the frame, and the piston rod 36 is contemporaneously lowered. The upper pinion end 18 of the core is inserted into chuck 7, and the same is manipulated to securely clamp the core therein. The tapered tip 50 is then connected with the lower pinion portion 18 of the core 2, and the entire assembly is bodily translated upwardly to a height whereby the tip clears the terminal edge 52 of the tubing free end 53. The cylinder is then re-engaged in the latch 43, thereby coaxially positioning the core and tubing for insertion. The operator again activates the cylinder and translates the core downwardly to a position wherein the inclined leading edge 51 of the tip 50 abuts and seals against the terminal edge 52 of the tube free end 53. Pressurized air is then supplied to the flexible tubing which inflates the same and radially expands the unconstricted side wall thereof to an enlarged inside diameter which is substantially commensurate with the outside diameter of the core. Since further expansion of the tubing side wall breaks the seal with the core, the arrangement provides a self-regulating seal. The stabilizers are then adjusted by the operator such that the V-shaped channels are positioned adjacent to the associated outer portion of the tubing side walls but do not clamp the same thereinbetween. In this manner, the stabilizers prevent the tubing from bending or buckling during core insertion, and do not interfere with the expanded, uniform lateral cross-sectional shape of the tubing in the insertion area. A clearance in the nature of ⅛ - 1/16 inch between the stabilizer and the tubing has been found to be satisfactory for inserting cores having a 1¼ inch outside diameter into tubing having an uninflated inside diameter of 1 inch. The downward translation of the core is then continued, and the air pressure is adjusted to a suitable level wherein a film of air passes between the inside surface of the flexible tubing and the outside surface of the core, and acts as a lubricant for efficient core insertion without tubing damage. The core 2 is inserted into the flexible tubing to a predetermined point, and in the illustrated type of core, the trailing end 122 of the core body 15 is positioned coplanar with the terminal edge 52 of the tubing free end 53. The pressurized air source 8 is then deactivated, thereby deflating the flexible tubing, and resiliently and frictionally engaging the same with the core 2. Next, the stabilizers 114, 115 and 116, are each retracted to an open position as illustrated in FIG. 7. The tubing is then cut at a length commensurate with the core, and the tip is removed from the lower end of the core. The tubing is preferably provided in a continuous elongate segment, which has a length substantially greater than that of a single core, whereby the elongate segment will cover a plurality of like cores. Means for selectively retaining the elongate segment of tubing such as reel 88 are provided. After the tip 50 is removed from the first assembled core 2, the remaining tubing is unclamped, and an additional segment of the same is payed from the tubing retaining reel 88, and is positioned within the clamp 5. The tubing is then reclamped at a point spaced apart from the new terminal edge, and the steps of the methods are then repeated. To assist in the elevation and/or paying of the tubing from the storage means, after deactivating the pressurized air means, the operator loosens clamps 5, retracts the stabilizers, and then elevates the cylinder 24 and connected core 2. Because the tubing is frictionally engaged with the core, the same is elevated by the cylinder along with the core, and may then be reclamped at an appropriate place before the tubing covering the first assembled core is severed to length.

It is to be understood that while we have illustrated and described certain forms of our invention, it is not to be limited to the specific forms or arrangement of parts herein described and shown.

We claim:

1. In an apparatus for inserting a rigid core into a segment of flexible tubing; said apparatus having means for retaining said tubing, motor means for translating said core, and pressurized air means for expanding a free end of said tubing, the improvement comprising:
   (a) a stabilizer connected with and supported by said apparatus, including laterally adjustable members having an operative position wherein the same are adjacent to, in slightly spaced, nonclamping relationship with opposing sides of the free end of said tubing in an inflated condition, and including a locking mechanism selectively and rigidly retaining said adjustable members in said operative position for preventing bending and buckling of said tubing free end during insertion of said core therein by abuttment with said adjustable members.

2. An improvement as set forth in claim 1 including:
   (a) a tapered tip for connection with an end of said core; said tip having an inclined leading edge thereof for abutting and sealing contact with a terminal edge of said tubing free end; and wherein
   (b) said tubing free end is unconstricted and forms a self-regulating seal with said core.

3. An apparatus for inserting cores into flexible tubing comprising:
   (a) a structure for supporting a core and a segment of flexible tubing thereon; said core being rigid, having first and second ends, and an outside diameter; said tubing having a flexible side wall, a free end, and a central axial aperture with an inside diameter;
   (b) retaining means connected with said supporting structure for receiving and retaining said tubing therein; said tubing having first and second portions thereof extending from opposite ends of said retaining means respectively and communicating through said central aperture; said tubing first portion extending a spaced apart distance associated with said core to a terminal edge of said tubing free end, and having the side wall thereof unconstricted;
   (c) motor means connected with said supporting structure in spaced relation to said retaining means; said motor means engaging said core and positioning the same adjacent to and coaxially with said tubing free end, and bodily translating said core longitudinally and coaxially with respect to said tubing first portion;
   (d) a tapered tip for connection with the first end of said core, and having an inclined leading edge thereof for abutting and sealing contact with the terminal edge of said tubing free end;
   (e) pressurized air means for connection with the second portion of said tubing and communicating with the central aperture therein, whereby said air means inflates said tubing and readily expands said unconstricted first portion side wall to an enlarged inside diameter substantially commensurate with the outside diameter of said core;
   (f) a stabilizer connected with and supported by said supporting structure, and including laterally adjustable members, for nonclampingly positioning the same adjacent to opposing sides of said tubing first portion in an inflated condition, and preventing bending and buckling of said tubing first portion during insertion of said core therein.

4. An apparatus as set forth in claim 3 wherein:
   (a) said supporting structure comprises a derrick having a top support; and
   (b) said motor means is connected with and supported by said top support for vertical translation and insertion of said core into said flexible tubing first portion.

5. An apparatus as set forth in claim 4 wherein:
   (a) said motor means comprises a ram having an upper end thereof pivotally attached to said derrick top support, and including
   (b) a chuck connected with a lower end of said ram and adapted for engaging the second end of said core; and
   (c) a latch selectively engaging said ram for positioning and retaining said core in a coaxial orientation with said tubing during core insertion.

6. An apparatus as set forth in claim 3 wherein:
   (a) said laterally adjustable stabilizer members each include a V-shaped channel for engaging variously sized tubing; and
   (b) means laterally translating ech V-shaped channel in infinitely small increments.

7. An apparatus as set forth in claim 4 wherein:
   (a) said laterally adjustable stabilizer members each includes a V-shaped channel for engaging variously sized tubing, and a housing wherein said channel is telescopically mounted; and including
   (b) screw means connecting said channel with said housing and laterally adjusting the same in infinitely small increments;
   (c) first and second support arm pivotally connecting said derrick and each housing for rotation in a substantially horizontal plane; and wherein
   (d) said support arms include an over-center lock having resilient means for selectively retaining the same in a locked position.

8. An apparatus as set forth in claim 7 wherein said resilient means comprises:
   (a) a pair of second arms each having one end thereof pivotally connected with said derrick, and another end thereof fixedly attached to a different one of each housing; and
   (b) first and second leaf springs each having one end thereof connected with a different one of said second arms and another end thereof abutting each other; said leaf springs urging said support arms apart and retaining the same in a locked position during core insertion.

9. An apparatus as set forth in claim 7 wherein:
   (a) said stabilizer constitutes a first stabilizer; and including
   (b) second and third stabilizers each having a design substantially similar to said first stabilizer, being positioned longitudinally along said tubing first portion, and having a pivotal connection with said derrick for rotation in a substantially horizontal plane, for assembling flexible tubing on cores of various lengths.

10. An apparatus as set forth in claim 3 wherein:
(a) said supporting structure includes a plate connected therewith at a working height above an apparatus supporting surface; said plate being positioned along a substantially horizontal plane and including a U-shaped aperture therethrough extending through a front edge of said plate for receiving said tubing therein;
(b) said clamp comprises first and second laterally adjustable jaws positioned on opposing sides of said tubing, and including arcuately shaped members adapted for mating contact with said tubing side wall; and including
(c) track means mounting said jaws on opposite sides of said plate aperture for converging and diverging translation of said jaws; said frame supporting said jaws, and said track means confining said jaw translation to substantially linear motion.

11. A method for assembling a cover of tightly fitting flexible tubing onto a rigid roller core, comprising the steps of:
(a) providing a structure for supporting said core and said tubing thereon; said structure including means for retaining said tubing therein;
(b) clamping said flexible tubing in said retaining means whereby first and second portions of said tubing extend from opposite ends of said retaining means; said first tubing portion extending a spaced apart distance associated with said core from said retaining means to a terminal edge of said tubing first portion, and having an unconstricted side wall;
(c) connecting pressurized air means with said tubing second portion for communication therewith;
(d) connecting a tapered tip to the first end of said core;
(e) translating said core bodily and coaxially with respect to said tube until a leading edge of said tip abuts and seals against the terminal edge of said tubing first portion;
(f) activating said pressurized air means thereby inflating said unconstricted tubing first portion side wall and radially extending the same to an enlarged interior diameter adapted for receiving said core therein;
(g) positioning laterally adjustable stabilizer members on opposing sides of said first portion, and adjusting said stabilizer members to a position disposed nonclampingly adjacent to an outer portion of said tubing first portion sides for preventing bending and buckling of said tubing during core insertion;
(h) continuing core translation until said core is covered by said flexible tubing;
(i) deactivating said pressurized air means, thereby deflating said tubing for resilient, constricting frictional engagement with said core;
(j) cutting said tubing first portion to a length commensurate with said core, at a first point on said tubing; and
(k) removing said tip from the first end of said core.

12. A method as set forth in claim 11 wherein:
(a) said tubing, core and supporting structure are each substantially vertically oriented, whereby said core is vertically translated for insertion into said core.

* * * * *